United States Patent [19]

Parmer et al.

[11] 4,111,512
[45] Sep. 5, 1978

[54] STRAIN RELIEF COVER FOR FLAT FLEXIBLE CABLE CONNECTOR

[75] Inventors: Kenneth Ronald Parmer; David Murray Little, both of Harrisburg, Pa.

[73] Assignee: AMP Incorporated, Harrisburg, Pa.

[21] Appl. No.: 805,958

[22] Filed: Jun. 13, 1977

[51] Int. Cl.² ............................................ H01R 13/58
[52] U.S. Cl. ............................... 339/105; 339/103 M; 339/210 M
[58] Field of Search ................. 339/105, 17 F, 97 C, 339/97 R, 97 P, 103 M, 210 M

[56] References Cited

U.S. PATENT DOCUMENTS

| 3,369,214 | 2/1968 | Krumreich et al. | 339/105 |
| 3,795,885 | 3/1974 | Desso et al. | 339/103 M X |
| 3,820,055 | 6/1974 | Huffnagle et al. | 339/97 P X |
| 4,006,957 | 2/1977 | Narozny | 339/103 M |

*Primary Examiner*—Roy Lake
*Assistant Examiner*—DeWalden W. Jones
*Attorney, Agent, or Firm*—Russell J. Egan

[57] ABSTRACT

An improved strain relief device is disclosed incorporated to a cover of a multi-conductor flat flexible cable connector. The connector includes a plurality of insulation piercing contacts which engage in the respective conductors of the cable and latchingly secure the cover to the connector housing. The cover also provides a tortuous path for the cable thereby providing a strain relief function.

5 Claims, 4 Drawing Figures

STRAIN RELIEF COVER FOR FLAT FLEXIBLE CABLE CONNECTOR

BACKGROUND OF THE INVENTION

1. The Field of the Invention

The present invention relates to a strain relief device for use with multiple conductor flat flexible cable connectors.

2. The Prior Art

There are many well known strain relief devices for use with multiple conductor flat flexible cable connectors. For example, U.S. Pat. No. 4,006,957 discloses a multi-part assembly including a connector base member 22, a keeper member 44, a cover member 50, and a strain relief member 70. Such an arrangement has the obvious disadvantages of being expensive to produce and difficult to assemble. The multi-part arrangement also requires keeping track of all the parts during assembly.

Another known strain relief device is represented by U.S. Pat. No. 3,795,885.

Most of the known strain relief devices all have their own unique problems and/or difficulties. High on the list of problems is they are usually separate pieces from the remainder of the connector. Thus there is the problem of the strain relief cover being lost during assembly or repair or subsequently inadvertently becoming detached from the connector itself.

The present Invention

The present invention overcomes the above-noted difficulties of the prior art by providing a combination cover and strain relief which form an integral portion of a multi-conductor flat flexible cable connector. The subject cover and strain relief device comprises a member having a first cable engaging surface having a plurality of contact receiving passages opening therein. A cable passage slot is formed in the member parallel to and spaced from the cable engaging surface. A cable is passed through the passage and reversed upon itself to lay against the cable receiving face. The member further includes means to latchingly secure it against a connector housing and means in each contact receiving slot for latchingly engaging the respective contact received therein.

DETAILED DESCRIPTION OF THE PREFERRED EMBODIMENT

Figure 1:
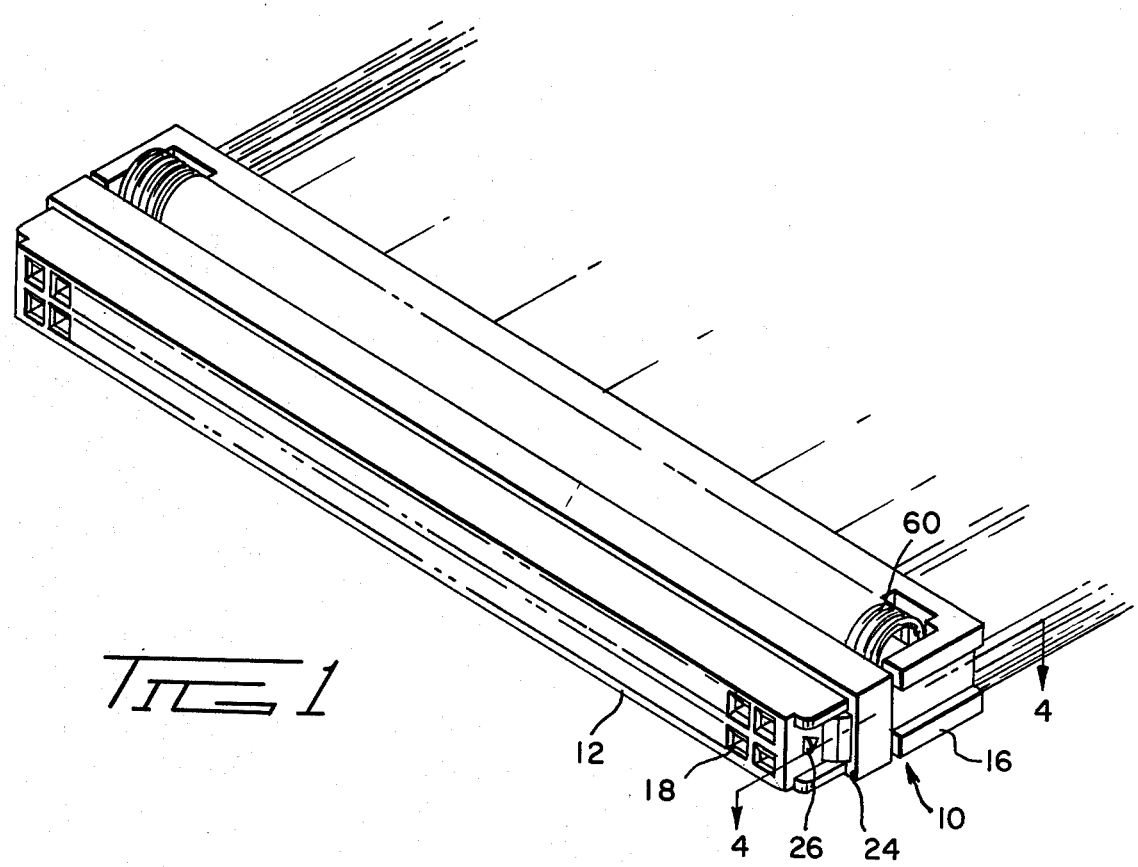
FIG. 1 is a perspective view of the subject invention.
Figure 2:
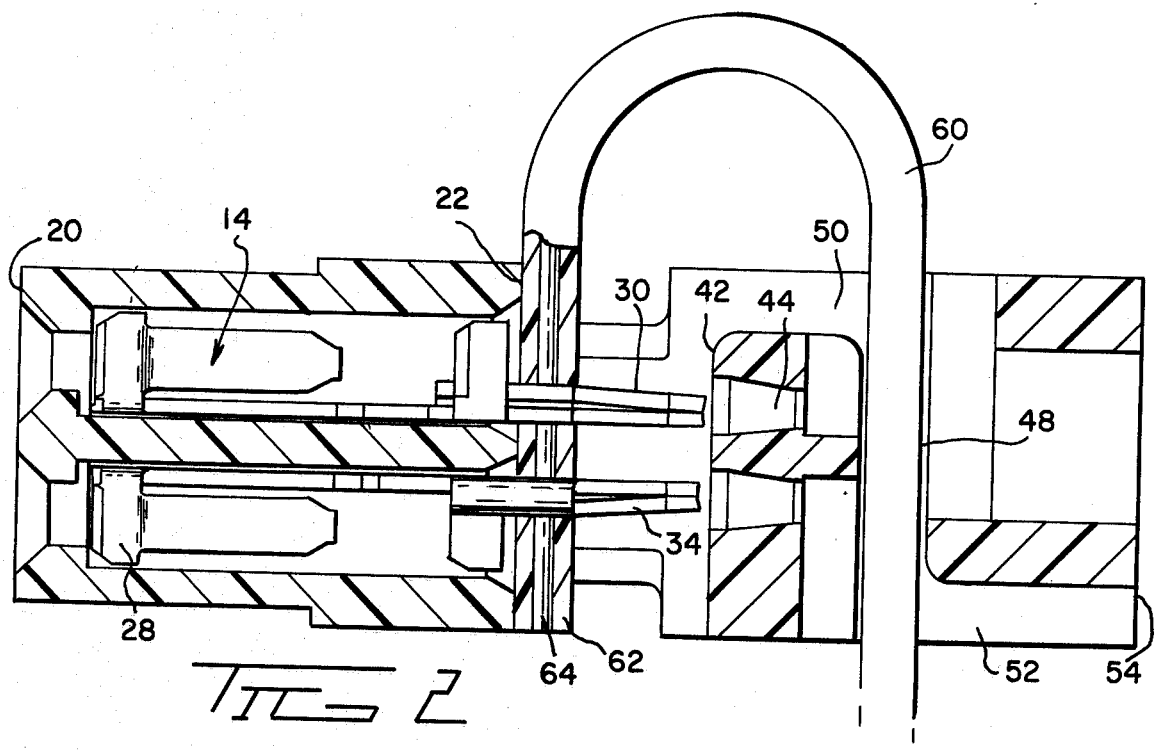
FIG. 2 is a vertical transverse section taken along line 2—2 of FIG. 1 showing the subject invention in an unmated condition.

The subject invention is intended for use as a portion of a known electrical connector 10. The connector 10 includes a contact housing 12, a plurality of electrical contacts 14, and the subject cover and strain relief member 16.

The contact housing 12 has a plurality of contact passages 18 extending therethrough from a mating face 20 to a cable receiving face 22. Latching means, including passages 24 and stops 26, are formed at opposite ends of the housing 12.

The contacts 12 are of the type disclosed in U.S. Pat. No. 3,820,055, the disclosure of which is incorporated herein by reference. Each contact 12 includes a mating portion 28 and an insulation displacing conductor engaging portion 30 including a pair of tines 32, 34 defining therebetween a conductor engaging slot 36. An outwardly directed latching shoulder 38, 40 is formed on the free end of the tines 32, 34, respectively.

The subject cover and strain relief member 16 has a cable supporting face 42 having a plurality of profiled contact receiving passages 44 extending therein, each forming latching shoulders 46 which are spaced inwardly of and parallel to face 42. Also parallel to and spaced from the contact face 42 is a cable passage 48. A first cable recess or channel 50 extends between the cable passage 48 and the cable face 42 and a second cable recess or channel 52 extends from the cable passage 48 to the rear face 54 of the cover and strain relief member on the opposite side from the first cable recess or channel 50. At each end of the cover and strain relief member 16 there is a latching leg 56 with an outwardly directed shoulder 58.

Figure 3:
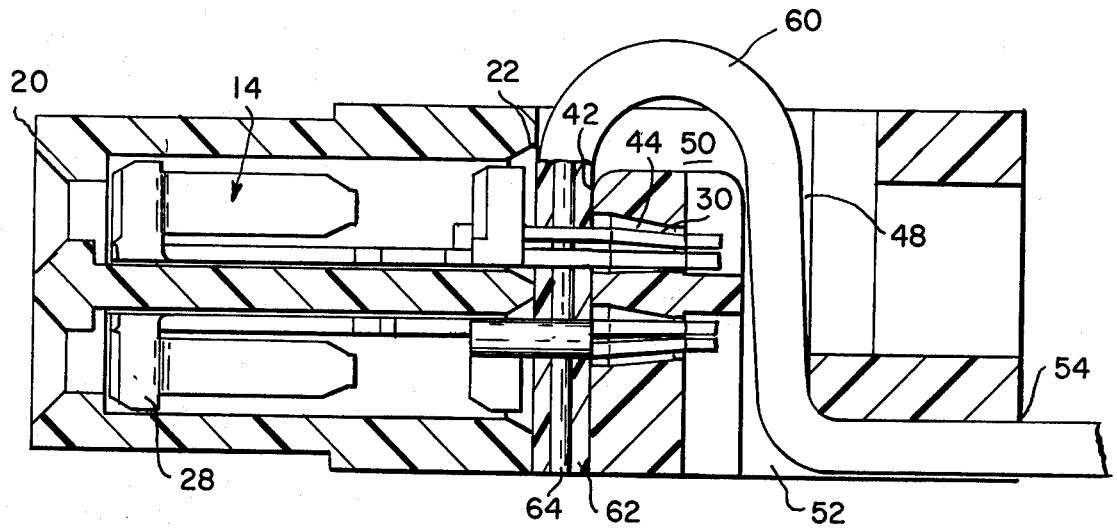
FIG. 3 is a view similar to FIG. 2 showing the subject invention in the fully latched and locked position.
Figure 4:
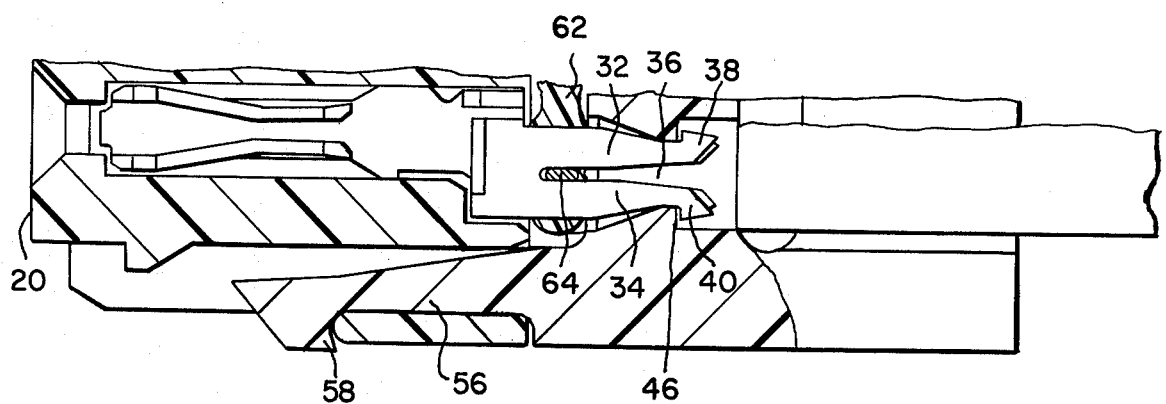
FIG. 4 is a horizontal transverse section taken along line 4—4 of FIG. 1.

The subject cover and strain relief is utilized by passing a cable 60 through the passage 48 from the side of the second recess 52 and wrapping it around through recess 50 to lie against the face 42. The cable 60 is then terminated with the contacts 14 preloaded in housing 12, in the manner described in the noted U.S. Pat. No. 3,820,055, by pressing the cable 60 and contacts 14 together so that the contacts 14 penetrate the insulation 62 and engage the respective conductors 64 of the cable. The cable 60 is then pulled back and the cover and strain relief member 16 is positioned in line with respect to the contact housing 12 with the latching legs 56 aligned with passages 24 and the conductor engaging portions 30 of contacts 14 aligned for entry into the passages 44. A second crimping takes place to fully latch the cover and strain relief member 16 onto the contacts 14 and housing 12 as shown in FIGS. 3 and 4. The cable 60 can then extend normally from the assembled connector, flowing straight out of the passage 48, or can be aligned with the recess 52 to lie substantially parallel to the axis of the connector 10.

The present invention may be subject to many modifications and changes without departing from the spirit or essential characteristics thereof. The present embodiment is therefore to be considered in all respects as merely illustrative and not restrictive of the scope of the invention.

What is claimed is:

1. An electrical connector for terminating multiple conductor flat flexible cable, said connector comprising:
    a contact housing having a mating face, a cable engaging face, a plurality of contact passages extending between said faces, and latching means;
    a like plurality of electrical contacts each mounted in a respective one of said contact passages with a matable portion adjacent said mating face and an insulation displacing conductor engaging portion extending from said cable engaging face, said insulation displacing conductor engaging portion comprising a pair of parallel spaced tines defining a slot therebetween and outwardly directed latching shoulders on the free end of each tine;
    a cover and strain relief member having a cable supporting face with a like plurality of profiled contact receiving passages extending therein each defining a latching shoulder parallel to and spaced inwardly from said cable supporting face, cable passage parallel to and spaced from said face, and latching means cooperating with the latching means of said contact housing, whereby a cable follows a tortuous path through the passage and around to the supporting face where it is terminated and thus a strain relief function is provided.

2. The connector according to claim 1 further comprising a cable receiving channel extending along one surface of said cover and strain relief member between said cable supporting face and said cable passage.

3. A connector according to claim 2 further comprising a second cable channel extending from said cable passage to a rear surface of said cover and strain relief member on the side opposite said first cable channel.

4. An improved cover and strain relief member for use with multiple conductor flat flexible cable connectors having a plurality of insulation displacing electrical contacts mounted extending from a contact housing, said member comprising:
an elongated cover having means at each end for latchingly engaging said contact housing, said cover having a cable supporting face with a plurality of profiled contact receiving passages therein each defining latching shoulders spaced inwardly from and parallel to said face, a cable passage also parallel to and spaced from said face, and a first cable receiving channel extending along one surface of said cover between said cable supporting face and said cable passage, whereby a cable follows a tortuous path through the passage and around to the face where it is terminated and a strain relief function is thus provided.

5. A cover and strain relief member according to claim 4 further comprising a second cable channel extending from said cable passage to a rear surface of said cover on the opposite side from said first cable channel.

* * * * *